United States Patent [19]

Wiley

[11] 3,903,474

[45] Sept. 2, 1975

[54] PERIODIC PULSE CHECK CIRCUIT

[75] Inventor: Paul Ronald Wiley, Naperville, Ill.

[73] Assignee: Bell Telephone Laboratories, Incorporated, Murray Hill, N.J.

[22] Filed: July 29, 1974

[21] Appl. No.: 492,541

[52] U.S. Cl. ................ 328/120; 307/214; 307/215; 307/232; 328/110; 340/167 R; 340/146.1 F

[51] Int. Cl.[2] ..................... H03K 5/18; H03K 13/32

[58] Field of Search ........... 307/232, 234, 262, 214, 307/215; 328/109, 110, 120, 119; 340/167 R, 167 B, 146.1 R, 146.1 BE, 146.1 F

[56] References Cited

UNITED STATES PATENTS

| | | | |
|---|---|---|---|
| 2,866,091 | 12/1958 | Ault | 307/234 |
| 3,328,762 | 6/1967 | Prather | 340/167 B |
| 3,667,054 | 5/1972 | Nelson | 307/234 |

*Primary Examiner*—Stanley D. Miller, Jr.
*Attorney, Agent, or Firm*—J. C. Albrecht

[57] ABSTRACT

An error checking circuit for checking periodic pulses for the absence of a pulse or the presence of a spurious pulse. A sequence of periodic pulses is passed through an inverter gate delay line having outputs available from each gate in the delay line. The outputs from even-numbered gates are connected to the inputs of a first gate whose output is a missing pulse error signal when that condition exists. The outputs from odd-numbered gates are connected to the inputs of a second gate whose output is a spurious pulse error signal when such a pulse occurs. Memory means are also provided to store the two output signal conditions.

11 Claims, 2 Drawing Figures

PERIODIC PULSE CHECK CIRCUIT

BACKGROUND OF THE INVENTION

This invention relates to data processing systems and particularly to error checking circuits in such systems.

In data processing systems periodic pulses are employed to perform control and timing functions. To ensure system integrity, such pulses must have relatively fixed time duration and they must occur regularly. The absence of a pulse or the presence of a spurious pulse may seriously affect the operation of the system. Also, a periodic pulse generator may malfunction to maintain its high or low output state beyond a prescribed interval and cause system disruption.

Prior checking circuits have utilized analog circuits arranged so that they time-out and generate an error signal if they are not consistently reset by periodic pulses. Since digital and analog circuits generally have different electrical and physical characteristics, it is disadvantageous to mix such circuits in a system.

It is an object of this invention to provide a pulse checking circuit which can be constructed from commercially available digital circuit elements having typical nonuniform delay characteristics.

SUMMARY OF THE INVENTION

In accordance with the present invention a circuit for checking periodic pulses comprises a delay line having a plurality of output taps located such that for a correct input pulse sequence there will be specified patterns of signals on the plurality of output taps. A predetermined timing relationship between a periodic pulse source and a delay line is necessary for the practice of the present invention.

BRIEF DESCRIPTION OF THE DRAWING

A periodic pulse check circuit according to this invention will be better understood from a consideration of the detailed description of the organization and operation of one illustrative embodiment thereof which follows when taken in conjunction with the accompanying drawing, in which.

DETAILED DESCRIPTION

Figure 1:
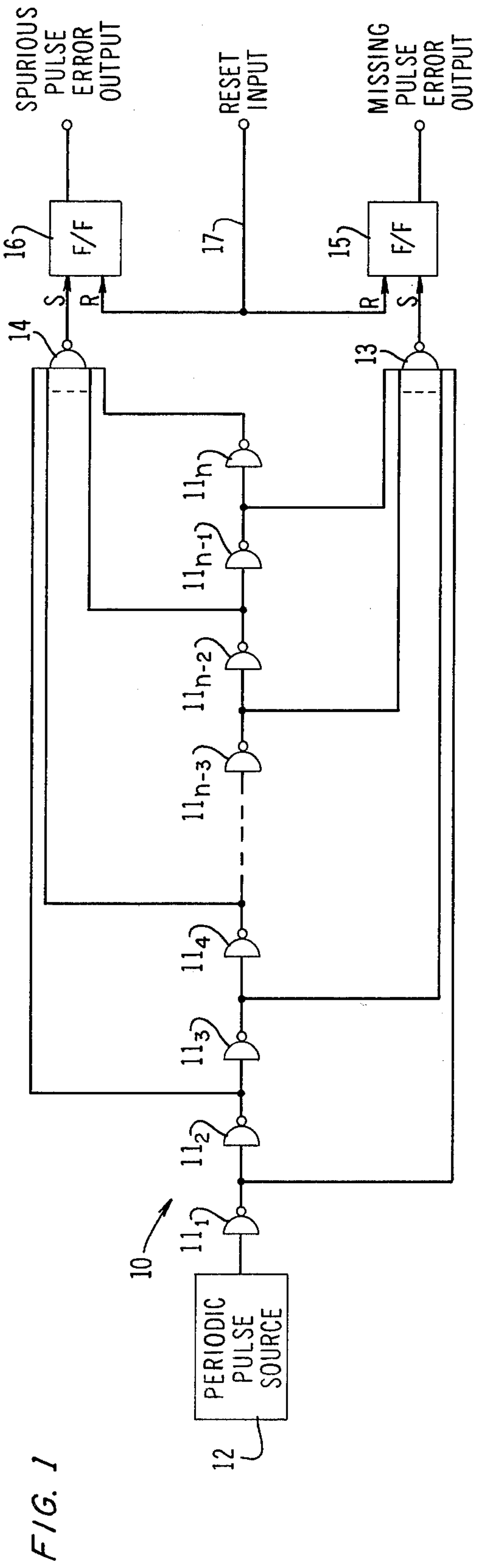
FIG. 1 depicts an exemplary periodic pulse checking circuit according to this invention.

One illustrative check circuit according to this invention is shown in FIG. 1 as a delay line 10 comprising $n$ inverter gates $\mathbf{11}_1$ through $\mathbf{11}_n$ connected in series. The input of the first gate $\mathbf{11}_1$ of the delay line is adapted to receive a periodic signal of the character shown in FIG. 2, comprising periodic pulses which are ideally identical in shape, time duration, and interpulse spacing, from a pulse source 12. Each odd-numbered delay line gate $\mathbf{11}_1$, $\mathbf{11}_3$, . . . $\mathbf{11}_{n-1}$ has its output connected to a respective input of a NAND gate 13 in addition to being connected to the input of the next successive inverter gate in delay line 10. An output of NAND gate 13 sets flip-flop 15 which indicates that a pulse is missing when that condition occurs. Each even-numbered delay line gate $\mathbf{11}_2$, $\mathbf{11}_4$, . . . , $\mathbf{11}_{n-2}$, $\mathbf{11}_n$ has its output connected to a respective input of a NAND gate 14 in addition to being connected to the input of the next successive gate of delay line 10. The output of NAND gate 14 sets flip-flop 16 which indicates the presence of a spurious pulse when such a pulse appears. Flip-flops 15 and 16 are reset by a signal applied to conductor 17 in order to prepare the circuit to detect errors.

When periodic pulses are applied to the input of delay line 10 by periodic pulse source 12, each positive pulse is inverted by gate $\mathbf{11}_1$ and, therefore, appears after a certain delay at the output of gate $\mathbf{11}_1$ and the input of NAND gate 13 as a negative pulse. A positive pulse will be assigned the binary value of 1 and a negative pulse the binary value 0. Since a 0 state at any one of the inputs of a NAND gate will hold its output in a 1 state, the output of NAND gate 13 will be in a 1 state. As each pulse progresses through delay line 10 it will cause a 0 state to be applied to successive inputs of gate 13 and thereby keep the output of the latter gate in a 1 state, which indicates the presence of properly timed periodic pulses. The number of gates $n$ in delay line 10, in cooperation with the pulse timing and gate delay time, is such that there will always be a pulse in delay line 10 to hold the output of gate 13 in a 1 state if all the pulses in a sequence of periodic pulses are present. If a pulse is missing, there will be a sufficient interval with no pulses present in delay line 10 whereby all the inputs of gate 13 will be in a 1 state and the output of gate 13 will be in a 0 state which will set flip-flop indicating a missing pulse error.

An exemplary operation of the spurious pulse error section of a check circuit according to this invention may best be understood by observing that it is the same as the missing pulse error section with the difference that the outputs are connected to the alternate, inverter stages of the delay line 10. In other words, the spurious pulse error section checks for the presence of an interval between pulses and, if a spurious pulse is present in that interval, it indicates an error.

In the operation of a check circuit of this invention certain relationships between the periodic pulses and the delay times of the delay line 10 are maintained. The symbol $t_d$ will be used to represent the delay time through an inverter gate $\mathbf{11}_i$, used in delay line 10, where $1 \leq i \leq n$.

The gate delay times referred to in the following are for idealized gates. In practice, gates have delay times which may vary between certain statistical limits due to manufacturing variables. Each of the following relationships developed for idealized gate delay times are maintained for all actual gate delay times within the statistical limits established.

Figure 2:
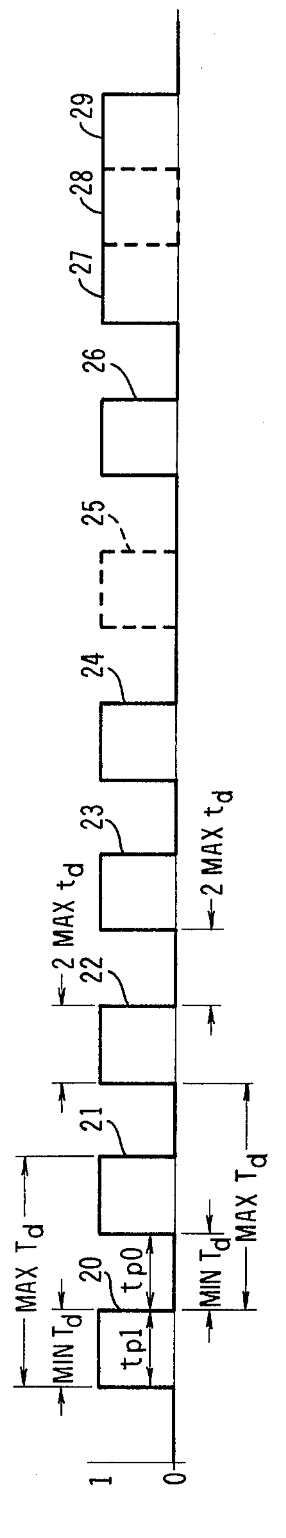
FIG. 2 depicts in idealized form a typical pulse sequence with a missing pulse and a spurious pulse and its timing relationships for the purpose of describing illustrative error detection operations of the embodiment of FIG. 1.

The sequence of periodic pulses shown in FIG. 2 is an idealized square wave pulse sequence having a 1-to-1 duty cycle. The duty cycle shown is for illustrative purposes only and periodic pulse sequences actually utilized may have a variety of duty cycles.

The symbol $T_d$ will be used to represent the delay between the first and last inputs to both NAND gates 13 and 14 which delay for the illustrative example may be expressed as $$T_d = (n\text{-}2)\ t_d. \qquad (1)$$

A first timing relationship that is satisfied is derived from the fact that, for the missing pulse detector with the application of an ideal sequence of periodic pulses, there will always be at least one pulse present in the delay line 10. In other words, the total delay time of delay line 10 between the first and last inputs to the gate 13 is greater than the time between pulses in a sequence of periodic pulses which relationship may be expressed as $$t_{p0} < T_d, \quad (2)$$

where $t_{p0}$ is the time between pulses as shown in FIG. 2. This relationship is satisfied in order to ensure that there will not be a period of time between pulses when no pulse appears in the delay line 10 which would generate a missing pulse error signal.

A second relationship which is satisfied is that existing in the condition of a missing pulse. If a pulse is missing, the time between the two remaining adjacent pulses must be greater than the time delay through the delay line 10 which relationship may be expressed as $$T_d < 2t_{p0} + t_{p1}, \quad (3)$$

where $t_{p1}$ is the time duration of a single pulse as shown in FIG. 2. If this condition were not satisfied, and if a single pulse were missing, the error would not be detected since either the preceding or succeeding pulse would always be present in the delay line 10.

A third relationship which must be satisfied is that the time delay between two successive inputs to gate 13 is less than the time duration of a single pulse, which relationship from the case of the illustrative embodiment may be expressed as $$t_d < \frac{t_{p1}}{2} \quad (4).$$

If this condition were not met, a pulse could be present in the delay line 10, between two inputs to gate 13 whereby gate 13 would generate an error signal.

Similar timing requirements must be satisfied for the spurious pulse error section. Since the spurious pulse error section is structurally the same as the missing pulse error section, but with output from alternate inverter gates, similar reasoning may be applied to an inverted pulse train and the following relationships may be derived from the illustrative example $$t_{p1} < T_d < 2t_{p1} + t_{p0}; \quad (5)$$

$$t_d < \frac{t_{p0}}{2} \quad (6).$$

Inequality relationship 5 is a combination of the analogous relationships 2 and 3.

An illustrative operation of the check circuit of this invention may now be considered for a missing pulse. FIG. 2 illustrates such a condition with a pulse 25 which should be present shown in dotted outline. It may be observed from foregoing relationship 3 that the period between pulse 24 and pulse 26 is less than the total time delay of a pulse passing through delay line 10 and, therefore, there will be a period of time when no positive pulse is present in delay line 10 corresponding to the period between pulse 24 and pulse 26. When there is no pulse present in delay line 10 all of the inputs to gate 13 will be in a 1 state and, therefore, the output of gate 13 will be in a 0 state which will set flip-flop 15 thereby indicating a missing pulse error.

An illustrative operation of the check circuit may now be considered for an extra spurious pulse. An extra pulse 28 is shown in FIG. 2 as occupying the normal interpulse period shown in dotted outline. It may be observed from a consideration of foregoing relationship 5 that the extra pulse 28 will result in a period during which delay line 10 will have a positive pulse present at every point in the delay line. This time period during which the defective condition exists corresponds to the period between the beginning of pulse 27 and the end of pulse 29. When a pulse is present at every point in delay line 10 all inputs of gate 14 will be in a 1 state and thereby its output will be in a 0 state which will set flip-flop 16 indicating that a spurious pulse error has occurred.

Inverter gates of the type used in delay line 10 of the invention normally have a wide variation between maximum and minimum delay time due to manufacturing variations. Inequality relationships 2 through 6 are satisfied for both minimum and maximum delay times of inverter gates used in delay line 10. A wide variation in delay time of inverter gates can be tolerated and thus the ability to use delay elements whose delay time is relatively imprecise is one of the important advantages of the invention.

What has been described is considered to be only a specific illustrative embodiment of the invention and it is to be understood that various other arrangements may be devised by one skilled in the art without departing from the spirit and scope thereof as defined by the accompanying claims.

What is claimed is:

1. A circuit for checking the accuracy of sequences of periodic pulses of predetermined pulse and interpulse time durations comprising:

delay means comprising an input terminal for receiving pulse sequences, a plurality of serially connected delay elements and a plurality of output circuits connected to outputs of respective delay elements; and a logic gate having an output and a plurality of inputs connected respectively to said plurality of output circuits, each of said delay elements having a delay time less than said predetermined pulse time duration and the delay time between the first and the last of said plurality of output circuits being greater than said predetermined interpulse time duration and less than the predetermined time interval between alternate ones of said periodic pulses.

2. The periodic pulse check circuit of claim 1 wherein said logic gate comprises a NAND gate.

3. The periodic pulse check circuit of claim 2 wherein said delay means comprises a plurality of serially connected logic gates.

4. The periodic pulse check circuit of claim 2 wherein said delay elements each comprise an even number plurality of serially connected inverter gates.

5. An error checking circuit comprising:

a delay line means comprising an input terminal for receiving a sequence of periodic pulses of predetermined pulse and interpulse time durations and a plurality of serially connected inverter gates, each gate having a predetermined delay time;

a first logic NAND gate; and
a second logic NAND gate;
the outputs of alternate ones of said inverter gates being connected to respective inputs of said first logic NAND gate and the outputs of the remainder of said inverter gates being connected to respective inputs of said second logic NAND gate; and
the delay time of each of said inverter gates being less than one-half of said predetermined pulse time duration and less than one-half of said predetermined interpulse time duration, the number of said inverter gates being such that the delay time between the first and the last inputs of said first logic NAND gate is less than the time between the beginning of a pulse and the end of the next succeeding pulse and less than the time between two alternate pulses of said sequence of periodic pulses.

6. A periodic pulse check circuit comprising:
a delay line means comprising an input terminal for receiving a sequence of periodic pulses and a predetermined number of serially connected inverter gates each having a predetermined delay time;
a plurality of output circuits connected respectively to the output of a first of said inverter gates; and alternate successive ones of said inverter gates; and
logic gating means having inputs connected respectively to said output circuits for generating a failure output signal indicative of the presence of a particular combination of signals on said outputs of said inverter gates;
the delay time of each of said inverter gates being less than one-half the pulse time duration of said sequence of periodic pulses; and
the number of said inverter gates being such that the delay time between the first and the last inputs of said logic gating means is greater than the time duration between pulses of said sequence of periodic pulses, and such that the delay time between the first and the last inputs of said logic gating means is less than the time between two alternate pulses of said sequence of periodic pulses.

7. The periodic pulse check circuit of claim 6 wherein said logic gating means comprises a NAND gate.

8. A periodic pulse check circuit comprising:
a delay line means comprising an input terminal for receiving a sequence of periodic pulses and a predetermined number of serially connected inverter gates each having a predetermined delay time;
a plurality of output circuits connected respectively to the output of the second of said inverter gates and alternate successive ones of said inverter gates;
logic gating means having inputs connected respectively to said output circuits for generating a failure output signal indicative of the presence of a particular combination of signals on said output of said inverter gates;
said delay time of each of said inverter gates being less than one-half the interpulse time duration of said sequence of periodic pulses; and
the number of said inverter gates being determined so that the delay time between the first and the last inputs of said logic gating means is greater than the time duration of a pulse of said sequence of periodic pulses, and so that the delay time between the first and the last inputs of said logic gating means is less than the time between the beginning of a pulse and the end of the next succeeding pulse of said sequence of periodic pulses.

9. The periodic pulse check circuit of claim 8 wherein said logic gating means comprises a NAND gate.

10. A periodic pulse check circuit comprising: a plurality of serially connected inverter gates;
a first and a second NAND gate; and
means connecting the outputs of first alternate ones of said inverter gates to said first NAND gate and the outputs of second alternate ones of said inverter gates to said second NAND gate.

11. The periodic pulse check circuit of claim 10 wherein a first and second memory means are connected respectively to said first and second NAND gates.

* * * * *